US012561524B2

(12) United States Patent
Su et al.

(10) Patent No.: US 12,561,524 B2
(45) Date of Patent: Feb. 24, 2026

(54) TRAINING MACHINE LEARNING MODELS TO AUTOMATICALLY DETECT AND CORRECT CONTEXTUAL AND LOGICAL ERRORS

(71) Applicant: INTERNATIONAL BUSINESS MACHINES CORPORATION, Armonk, NY (US)

(72) Inventors: Jun Su, Beijing (CN); Su Liu, Austin, TX (US); Yang Liang, Beijing (CN); Richard Anthony LaFrance, Grosse Ile, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 18/455,396

(22) Filed: Aug. 24, 2023

(65) Prior Publication Data

US 2025/0068843 A1    Feb. 27, 2025

(51) Int. Cl.
*G06F 40/279* (2020.01)
*G06F 40/106* (2020.01)
(Continued)

(52) U.S. Cl.
CPC .......... *G06F 40/279* (2020.01); *G06F 40/106* (2020.01); *G06F 40/205* (2020.01); *G06F 40/232* (2020.01); *G06F 40/253* (2020.01)

(58) Field of Classification Search
CPC .... G06F 40/279; G06F 40/253; G06F 40/232; G06F 40/205; G06F 40/106
See application file for complete search history.

(56) References Cited

U.S. PATENT DOCUMENTS 10,387,565 B2    8/2019  Hoover et al.
2004/0002994 A1 *  1/2004  Brill ...................... G06F 40/232
(Continued)

FOREIGN PATENT DOCUMENTS

CN      109036464 B    12/2018
KR    20150092879 A    8/2015
WO      2020100018 A1    5/2020

OTHER PUBLICATIONS

K. Thadani, e al., "A Framework for Identifying Textual Redundancy", Creative Commons, Proceedings of the International Conference on Computational Linguistics, 2008, 8 pp. (available at https://aclanthology.org/C08-1110/).
(Continued)

*Primary Examiner* — Bhavesh M Mehta
*Assistant Examiner* — Edward Tracy, Jr.
(74) *Attorney, Agent, or Firm* — Konrad, Raynes, Davda & Victor, LLP; Janaki K. Davda

(57)            ABSTRACT

Provided are techniques for training Machine Learning (ML) models to automatically detect and correct contextual and logical errors. A plurality of machine learning models are trained. In response to receiving content, the content is parsed into different elements. One or more knowledge graphs are built based on the different elements. One or more machine learning models are selected from the plurality of machine learning models based on the one or more knowledge graphs and custom criteria in a user profile. The selected one or more machine learning models are used to identify at least one of a contextual error and a logical error and a correction for the at least one of the contextual error and the logical error. The correction for the at least one of the contextual error and the logical error is applied to generate corrected content. The corrected content is rendered.

20 Claims, 17 Drawing Sheets

(51) Int. Cl.

| | |
|---|---|
| *G06F 40/205* | (2020.01) |
| *G06F 40/232* | (2020.01) |
| *G06F 40/253* | (2020.01) |

(56) References Cited

U.S. PATENT DOCUMENTS

| | | | | |
|---|---|---|---|---|
| 2019/0361720 A1 * | 11/2019 | Balachandran | ......... | G06F 9/453 |
| 2021/0374329 A1 | 12/2021 | Deutsch | | |
| 2022/0335205 A1 * | 10/2022 | Li | ............................ | G06F 9/451 |
| 2022/0374605 A1 * | 11/2022 | Sethi | ..................... | G06T 19/006 |
| 2023/0154593 A1 * | 5/2023 | Gao | ........................ | G16H 30/40 |
| | | | | 382/181 |
| 2024/0273288 A1 * | 8/2024 | Gashteovski | ......... | G06F 40/253 |

OTHER PUBLICATIONS

A. Islam, et al., "Correcting Different Types of Errors in Texts", ResearchGate, May 2011, 13 pp. (available at https://www.researchgate.net/publication/225115578).

M. Mikowski, "Developing an open-source, rule-based proofreading tool", ResearchGate, Jan. 2010, 25 pp. (available at https://www.researchgate.net/publication/220282022).

H. Stehouwer, et al., "Language models for contextual error detection and correction", Association for Computational Linguistics, Proceedings of the EACL 2009 Workshop on Computational Linguistic Aspects of Grammatical Inference, Mar. 2009, 8 pp. (available at https://aclanthology.org/W09-1007/).

J. Zhu, et al., "Machine Learning-Based Grammar Error Detection Method in English Composition", Hindawi, Scientific Programming vol. 2021, Article ID 4213791, 2021, 10 pp. (available at https://www.hindawi.com/journals/sp/2021/4213791/).

F. Bannay et al., "Using a SMT solver for risk analysis: detecting logical mistakes in texts", IEEE, 2014 IEEE 26th International Conference on Tools with Artificial Intelligence, 2014, 8 pp. (available at https://ieeexplore.IEEE.org/document/6984569).

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

"Preps and Pro Pros", Patent Bots, [online][retrieved Jul. 27, 2023] https://www.patentbots.com/about-patent-proofreading, 5 pp.

"Personalized AI, Everywhere You Write", Grammarly, [online][retrieved Jul. 27, 2023] https://www.grammarly.com/, 7 pp.

"There's a better way to write", ProWritingAid, [online][retrieved Jul. 27, 2023] https://prowritingaid.com/, 10 pp.

"Hemingway App makes your writing bold and clear", Hemingway Editor, [online][retrieved Jul. 27, 2023] https://hemingwayapp.com/, 1 p.

Abedini et al. "Correction Tower: A General Embedding Method of The Error Recognition for The Knowledge Graph Correction", International Journal Of Pattern Recognition And Artificial Intelligence, Jan. 8, 2020, 38 pages, vol. 34, No. 10.

Chen et al. "Converge to the Truth: Factual Error Correction via Iterative Constrained Editing", arXiv:2211.12130, Feb. 23, 2023, 10 pages.

Dong et al. "Integrating Human-In-The-Loop into Swarm Learning for Decentralized Fake News Detection", Proceedings of The 2022 International Conference On Intelligent Data Science Technologies And Applications (IDSTA'22), Sep. 5, 2022, pp. 46-53.

Dong et al: "Faithful to the document or to the World? Mitigating hallucinations via entity-linked knowledge in abstractive summarization", arXiv:2204.13761, Apr. 28, 2022, 12 pages.

Fung et al. "InfoSurgeon: Cross-Media Fine-grained Information Consistency Checking for Fake News Detection", Proceedings of the 59th Annual Meeting of The Association for Computational Linguistics and the 11th International Joint Conference on Natural Language Processing (Acl-ljcnlp'21), Aug. 2021, pp. 1683-1698, vol. 1.

International Searching Authority, "Notification of Transmittal of the International Search Report and the Written Opinion of the International Searching Authority, or Declaration," Patent Cooperation Treaty, Oct. 24, 2024, 17 pages, International Application No. PCT/EP2024/068548, IBM Docket No. P202301776PCT01.

Lin et al. "A Joint Neural Model for Information Extraction with Global Features", Proceedings of the 58th Annual Meeting of the Association for Computational Linguistics, Jul. 2020, 7999-8009.

Sourati et al. "Case-Based Reasoning with Language Models for Classification of Logical Fallacies", arXiv:2301.11879 May 17, 2023, 13 pages.

Zhu et al. "Enhancing Factual Consistency of Abstractive Summarization", arXiv:2003.08612, Mar. 15, 2021, 16 pages.

* cited by examiner

100

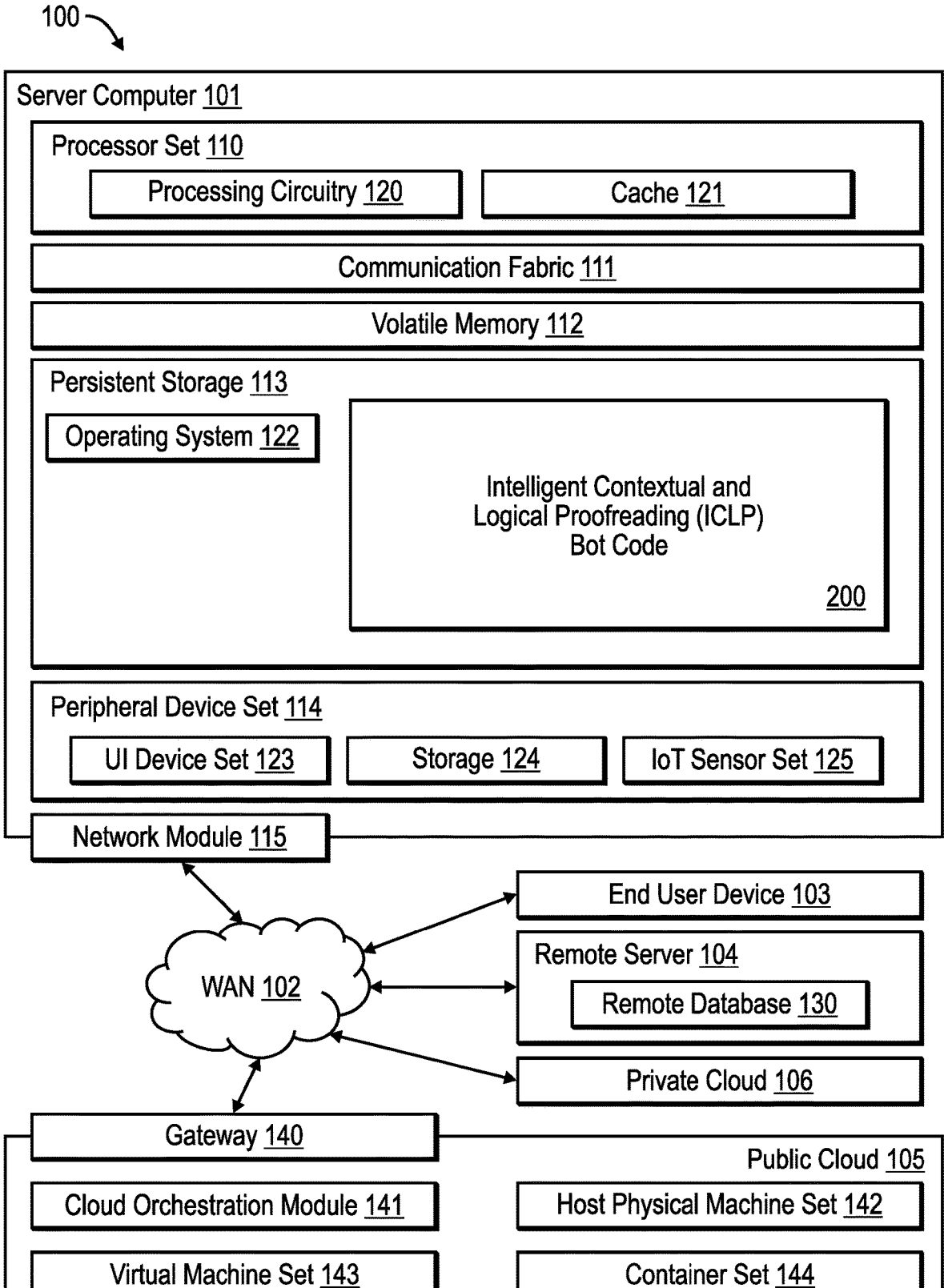

Server Computer 101

Processor Set 110

Processing Circuitry 120    Cache 121

Communication Fabric 111

Volatile Memory 112

Persistent Storage 113

Operating System 122

Intelligent Contextual and Logical Proofreading (ICLP) Bot Code

200

Peripheral Device Set 114

UI Device Set 123    Storage 124    IoT Sensor Set 125

Network Module 115

WAN 102

End User Device 103

Remote Server 104

Remote Database 130

Private Cloud 106

Gateway 140

Public Cloud 105

Cloud Orchestration Module 141    Host Physical Machine Set 142

Virtual Machine Set 143    Container Set 144

| Time Line | UserID | AppID | Content ID | Content Type | Content Category | Topic | A/B |
|---|---|---|---|---|---|---|---|
| Time-1 | NULL | NULL | NULL | NULL | NULL | NULL | |
| Time-2 | User0001 | APP0001 (Chat application) | UserA : UserB | Chat Conversation | IT: Computer: Customer Support: Globalization | Bug Confirmation | |
| Time-3 | User0001 | APP0001 (Chat application) | UserA : UserB | Chat Conversation | IT: Computer: Customer Support: Globalization | Bug Confirmation | |

| A/B | Input Buffer | Paragraph ID | Sentence ID | Error Type | Related Sentence [ContentID] [ParagraphID] [SentenceID] | Suggested Content | Proofreading Comments |
|---|---|---|---|---|---|---|---|
| | NULL | NULL | NULL | NULL | NULL | NULL | NULL |
| | I confirm our GUI does have the problem. | 003 | 003 | NULL | NULL | NULL | NULL |
| | I confirm that our GUI does have the problem. | 003 | 003 | Contradictions | [ContentID="UserA : UserB"] [ParagraphID=003] [SentenceID=001,002] I have tested them in our lab. These emoji characters can be displayed properly in our GUI. | I confirm that our GUI does not have the problem. | There is a logical error in the second sentence spoken by UserB. When UserA reported that the customer was having problems displaying the emoji characters, UserB responded that they would test the emojis to verify the issue. However, in the next sentence, UserB says that they have tested the emojis and that they can be displayed properly in the GUI. This contradicts the initial problem reported by the customer and suggests that there may be a problem with UserB's testing process or methodology. It would be more appropriate for UserB to report back to UserA that they were unable to replicate the problem and that further investigation may be needed to determine the cause of the issue. |

A/B

Corrected

Contradictions

| Time Line | UserID | AppID | Content ID | Content Type | Content Category | Topic | A/B |
|-----------|--------|-------|-----------|--------------|------------------|-------|-----|
| Time-1 | NULL | NULL | NULL | NULL | NULL | NULL | |
| Time-2 | User0001 | APP0002 (Word Processing Application) | P20220 9999 | Patent | IT: Patent | Authentication | |
| Time-3 | User0001 | APP0002 (Word Processing Application) | P20220 9999 | Patent | IT: Patent | Authentication | |

Equivalent entity identification in the example:
Knowledge Graph: memory =210 and storage =220;
Correction: correct storage 210 to storage 220.

TRAINING MACHINE LEARNING MODELS TO AUTOMATICALLY DETECT AND CORRECT CONTEXTUAL AND LOGICAL ERRORS

BACKGROUND

Embodiments of the invention relate to training machine learning models to automatically detect and correct contextual and logical errors. In particular, embodiments of the invention relate to training a bot and using the bot for automatically correcting contextual and logical errors.

Artificial Intelligence (AI) and Nature Language Processing (NLP) based Human Computer Interaction (HCI) application development is creating better user experiences. There are various AI and modules that may be used for enhancing HCI features on word processing application in real time.

For instance, some useful modules in the HCI environment include: Named Entity Recognition (NER), temporal relation extraction, event extraction, etc.

SUMMARY

In accordance with certain embodiments, a computer-implemented method comprising operations is provided for training machine learning models to automatically detect and correct contextual and logical errors. In such embodiments, a plurality of machine learning models are trained. In response to receiving content, the content is parsed into different elements. One or more knowledge graphs are built based on the different elements. One or more machine learning models are selected from the plurality of machine learning models based on the one or more knowledge graphs and custom criteria in a user profile. The selected one or more machine learning models are used to identify at least one of a contextual error and a logical error and a correction for the at least one of the contextual error and the logical error. The correction for the at least one of the contextual error and the logical error is applied to generate corrected content. The corrected content is rendered.

In accordance with other embodiments, a computer program product comprising a computer readable storage medium having program code embodied therewith is provided, where the program code is executable by at least one processor to perform operations for training machine learning models to automatically detect and correct contextual and logical errors. In such embodiments, a plurality of machine learning models are trained. In response to receiving content, the content is parsed into different elements. One or more knowledge graphs are built based on the different elements. One or more machine learning models are selected from the plurality of machine learning models based on the one or more knowledge graphs and custom criteria in a user profile. The selected one or more machine learning models are used to identify at least one of a contextual error and a logical error and a correction for the at least one of the contextual error and the logical error. The correction for the at least one of the contextual error and the logical error is applied to generate corrected content. The corrected content is rendered.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for training machine learning models to automatically detect and correct contextual and logical errors. In such embodiments, a plurality of machine learning models are trained. In response to receiving content, the content is parsed into different elements. One or more knowledge graphs are built based on the different elements. One or more machine learning models are selected from the plurality of machine learning models based on the one or more knowledge graphs and custom criteria in a user profile. The selected one or more machine learning models are used to identify at least one of a contextual error and a logical error and a correction for the at least one of the contextual error and the logical error. The correction for the at least one of the contextual error and the logical error is applied to generate corrected content. The corrected content is rendered.

BRIEF DESCRIPTION OF THE SEVERAL VIEWS OF THE DRAWINGS

Referring now to the drawings in which like reference numbers represent corresponding parts throughout:

FIG. 1 illustrates a computing environment in accordance with certain embodiments.

FIGS. 6A and 6B illustrate an example ICLP data structure in accordance with certain embodiments.

FIGS. 8A and 8B illustrate another example ICLP data structure 800 in accordance with certain embodiments.

DETAILED DESCRIPTION

Figure 2:
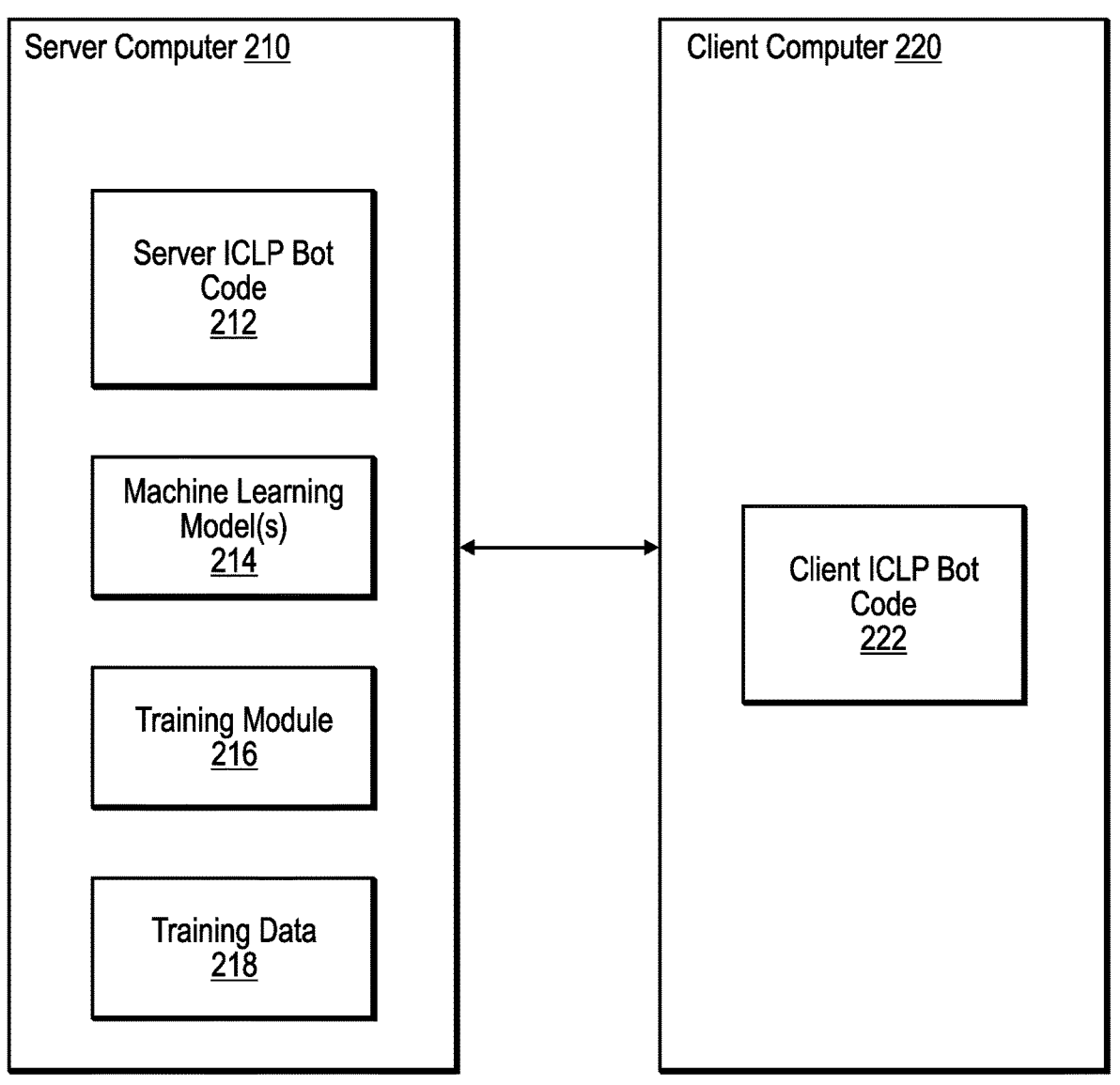
FIG. 2 illustrates, in a block diagram, a computing environment with a server computer connected to a client computer in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description herein provides examples of embodiments of the invention, and variations and substitutions may be made in other embodiments. Several examples will now be provided to clarify various aspects of the present disclosure:

Example 1: A method comprising training a plurality of machine learning models. In response to receiving content, the method further comprises parsing the content into different elements. The method further comprises building one or more knowledge graphs based on the different elements. The method further comprises selecting one or more machine learning models from the plurality of machine learning models based on the one or more knowledge graphs and custom criteria in a user profile. The method further comprises using the selected one or more machine learning models to identify at least one of a contextual error and a logical error and a correction for the at least one of the contextual error and the logical error. The method further comprises applying the correction for the at least one of the contextual error and the logical error to generate corrected content. The method further comprises rendering the corrected content.

Thus, embodiments provide improved computer processing efficiency by training a plurality of machine learning models rather than one machine learning model. In particular, embodiments advantageously provide machine learning models that are focused and so are more efficient (e.g., faster) and more accurate in detecting and correcting contextual and logical errors than other techniques. Such efficiency uses fewer computer processing resources (e.g., less processor utilization).

In addition, embodiments provide improved memory allocation by selecting and using one or more machine learning models (i.e., a subset) from the plurality of machine learning models based on the one or more knowledge graphs and custom criteria in a user profile. For example, loading the selected subset of machine learning models into memory uses less memory than loading one machine learning model that handles all contextual and logical errors.

Example 2: The limitations of any of Examples 1 and 3-7, wherein the parsing into the different elements is based on time, location, event, subject, verb, and object. Embodiments advantageously parse the content into different elements for case of building the one or more knowledge graphs and to improve the quality of the one or more knowledge graphs.

Example 3: The limitations of any of Examples 1-2 and 4-7, wherein the method further comprises updating the one or more knowledge graphs based on receiving additional content. Embodiments advantageously update the one or more knowledge graphs as additional content is received to improve the quality of the one or more knowledge graphs and to improve selection of the one or more machine learning models.

Example 4: The limitations of any of Examples 1-3 and 5-7, wherein the method further comprises receiving user input to configure the custom criteria and adjusting the custom criteria based on user feedback on the correction, wherein the custom criteria comprises identification of monitored applications, identification of types of errors to detect, and how to process the one or more types of errors. Embodiments advantageously enable customization of applications to monitor, errors to detect, and the processing of those errors. Thus, different users may have different customizations based on, for example, their roles in a company. In addition, embodiments use the custom criteria to improve selection of the one or more machine learning models. Such selection of one or more machine learning models based, in part, on this criteria both improves computer processing efficiency (e.g., less processor utilization) and provides improved memory allocation (e.g., since fewer machine learning models are loaded into memory).

Example 5: The limitations of any of Examples 1-4 and 6-7, wherein the method further comprises generating a data structure, wherein the data structure comprises columns for: a user identifier, an application identifier, a content identifier, a content type, a content category, a topic, an input buffer, a paragraph identifier, a sentence identifier, an error type, a related sentence identifier, suggested content, and proof reading comments. Embodiments advantageously generate a data structure to efficiently capture related data.

Example 6: The limitations of any of Examples 1-5 and 7, wherein each machine learning model of the plurality of machine learning models is retrained using user feedback on the correction. The user feedback may provide changes to suggested corrections and is used to improve the accuracy of corrections output by the plurality of machine learning models.

Example 7: The limitations of any of Examples 1-6, wherein training data for the plurality of machine learning models comprises sample pairs of a tagged error type and a corresponding correction. Embodiments advantageously train the plurality of machine learning models using training data with tagged error types and associated corrections. This allows each of the machine learning models to be trained for different error types and so makes each of the machine learning models more efficient and accurate.

Example 8: A computer program product, the computer program product comprising a computer readable storage medium having program instructions embodied therewith, the program instructions executable by a processor to cause the processor to perform a method according to any one of Examples 1-7.

Example 9: A computer system, comprising one or more processors, one or more computer-readable memories and one or more computer-readable, tangible storage devices and program instructions, stored on at least one of the one or more computer-readable, tangible storage devices for execution by at least one of the one or more processors via at least one of the one or more computer-readable memories, to perform a method according to any of Examples 1-7.

Example 10: The limitations of Examples 1 and 4, wherein embodiments advantageously enable customization so that different users may have different customizations based on, for example, their roles in a company. Additionally, the custom criteria are adjusted based on the user feedback on the correction and used to improve selection of the one or more machine learning models.

Example 11: The limitations of Examples 1, 6, and 7, wherein each machine learning model of the plurality of machine learning models is initially trained using training data and retrained using user feedback on the correction. This advantageously enables a loop to have a correction output by a machine learning model be corrected with user feedback and used to further train the machine learning model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as Intelligent Contextual and Logical Proofreading (ICLP) bot code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates, in a block diagram, a computing environment with a server computer 210 connected to a client computer 220 in accordance with certain embodiments. The server computer 210 includes server ICLP bot code 212, one or more machine learning models 214 ("error detection machine learning models"), a training module 216, and training data 218. The client computer 220 includes client ICLP bot code 222. In certain embodiments, the server computer 210 includes the components of computer 101, and the server ICLP bot code 212 is a portion of the ICLP bot code 200. In certain embodiments, the client computer 220 includes the components of computer 101, and the client ICLP bot code 222 is a portion of the ICLP bot code 200.

In certain embodiments, the ICLP bot code 200 performs the operations of the server ICLP bot code 212 and the client ICLP bot code 222 (e.g., at one computer 101).

In certain embodiments, the ICLP bot code 200 trains the one or more machine learning models 214 to automatically identify and correct contextual and logical errors in content. That is, in certain embodiments, the ICLP bot code 200 trains the one or more machine learning models 214 to perform one or more operations of the server ICLP bot code 212.

In certain embodiments, the training data 218 may include a set of samples, where each sample includes a pair made of a tagged error type and corrected content.

For example, a sample of an "operation order" with tagged "logical error" is:
1. Receive an instruction letter enclosed in envelope.
2. Read instructions in the letter.
3. Open the envelope.
4. Follow the instruction in the letter to pay the bill.
For this sample of "operation order", the corrected content is:
1. Receive an instruction letter enclosed in envelope.
2. Open the envelope.
3. Read instructions in the letter.
4. Follow the instruction in the letter to pay the bill.

Another sample of an "operation order" with tagged "logical error" is:
1. Login to your email account.
2. Find an email with Subject: "How to pay your bill?".
3. Read instructions in the email.
4. Open the email.
5. Follow the instructions to pay the bill.
For this sample of "operation order, the corrected content is:
1. Login to your email account.
2. Find an email with Subject: "How to pay your bill?".
3. Open the email.
4. Read instructions in the email.
5. Follow the instructions to pay the bill.

In certain embodiments, the training module 216 uses the above two samples and trains a machine learning model 214 to learn that the correct logical order between "open" and "read" is to first open a content item (e.g., email or document) and then read the content in that content item.

Then, in the real world, the machine learning model 214 may be used to determine the logical errors related to "open a content item" and then "read the content item".

In certain embodiments, the training data may also be generated from user feedback (e.g., accepting or rejecting suggested corrections) and manual proofreading corrections (e.g., a user proofreads, finds an error, and provides a correction).

In certain embodiments, the training module 216 trains multiple machine learning models 214. In certain embodiments, the training module 216 may train a different machine learning model 214 for each type of error (e.g., chronological errors, factual errors, logical fallacies, contradictions, inconsistencies, ambiguities, redundancies, etc.). In other embodiments, the training module 216 may train a particular machine learning model 214 for multiple error types.

In certain embodiments, the server ICLP bot code 212 calls the one or more machine learning models 214 to perform particular operations, while the server ICLP bot code 212 performs other operations.

Thus, in certain embodiments, the ICLP bot code 200 may be described as including the server ICLP bot code 212, the one or more machine learning models 214, and the client ICLP bot code 222.

In certain embodiments, the server ICLP bot code 212 and the client ICLP bot code 222 work together to identify and correct contextual and logical errors in large volumes of text or complex documents. In particular, the ICLP bot code 200 the server ICLP bot code 212 and the client ICLP bot code 222 work together to identify contextual and logical errors in real-time and dynamically correct the contextual and logical errors in real-time.

Certain embodiments provide the ICLP bot code 200 as Software as a service (SaaS) on top of an HCI environment.

The following are an example of contextual and logical errors:

Chronological errors: These errors occur when events or actions are presented in an incorrect order or timeline. For example, if a person's year of college graduation is described before the person's year of birth.

Factual errors: These errors occur when the information presented in the text is inaccurate or incorrect. For example, if the text describes that a certain animal is extinct when the animal is not extinct.

Logical fallacies: These errors occur when the arguments presented in the text contain flaws in reasoning. For example, if the text includes circular reasoning or makes an appeal to authority instead of providing evidence to support claims.

Contradictions: These errors occur when statements in the text contradict each other. For example, if the text describes that a certain event occurred on a particular day and then later describes the same event occurring on a different day.

Inconsistencies: These errors occur when the information presented in the text is inconsistent or contradictory. For example, if the text describes a character in one way at the beginning of a story and later describes the character differently without explanation (e.g., with a different height).

Ambiguities: These errors occur when the meaning of the text is unclear or ambiguous. For example, if the text uses vague or imprecise language that may be interpreted in multiple ways.

Redundancies: These errors occur when information is repeated unnecessarily in the text. For example, if the text uses multiple words or phrases that mean the same thing.

Figure 3A:
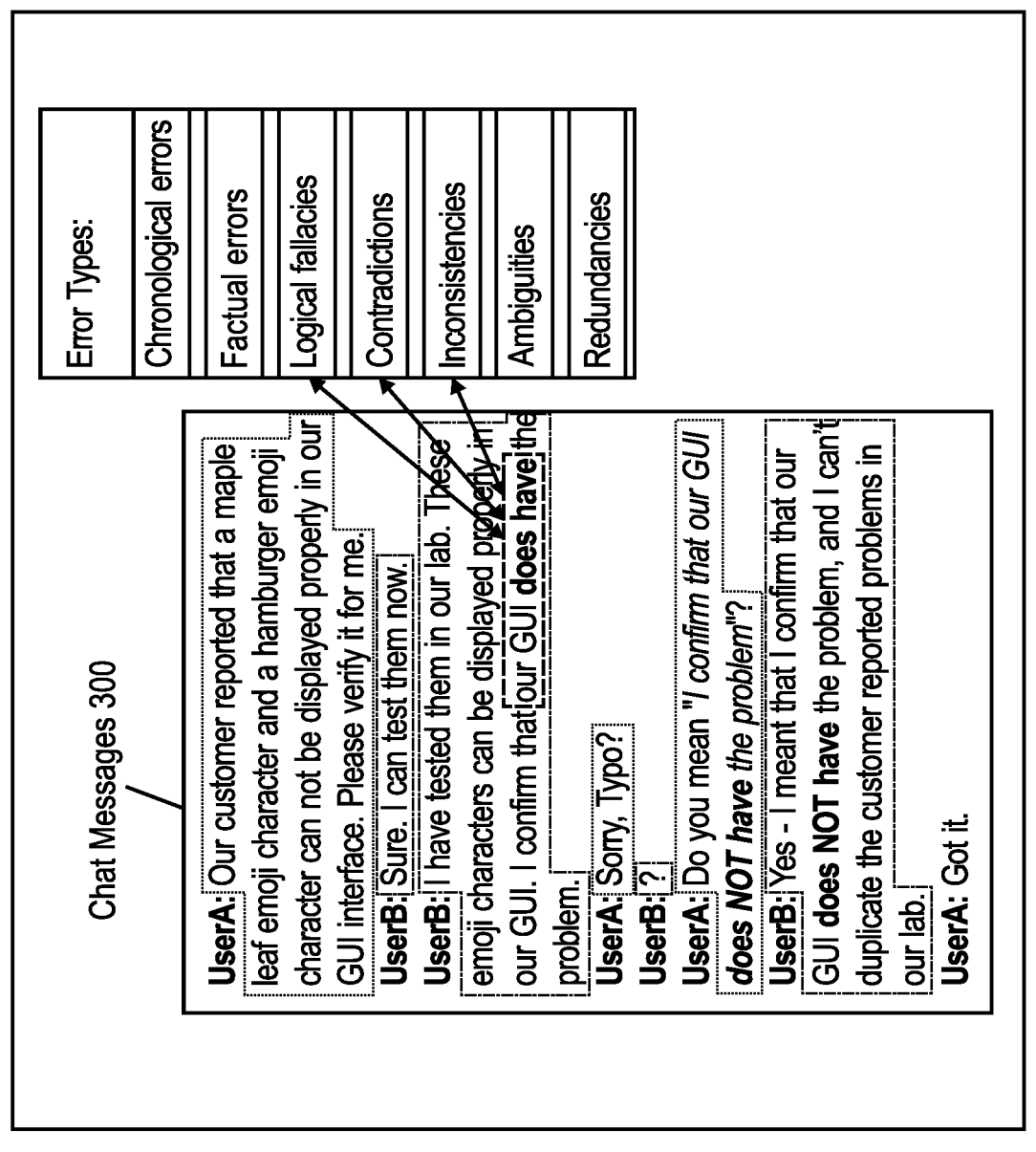
FIG. 3A illustrates an example of a logical error in accordance with certain embodiments.

FIG. 3A illustrates an example of a logical error in accordance with certain embodiments. In FIG. 3A, chat application messages 300 indicate that UserB states: "I have tested them in our lab. These emoji characters can be displayed properly in our GUI. I confirm that our GUI does have the problem.". However, the phrase "our GUI does have the problem" is a logical fallacy, is a contradiction, and is inconsistent with the prior phrase "emoji characters can be displayed properly in our GUI".

Figure 3B:
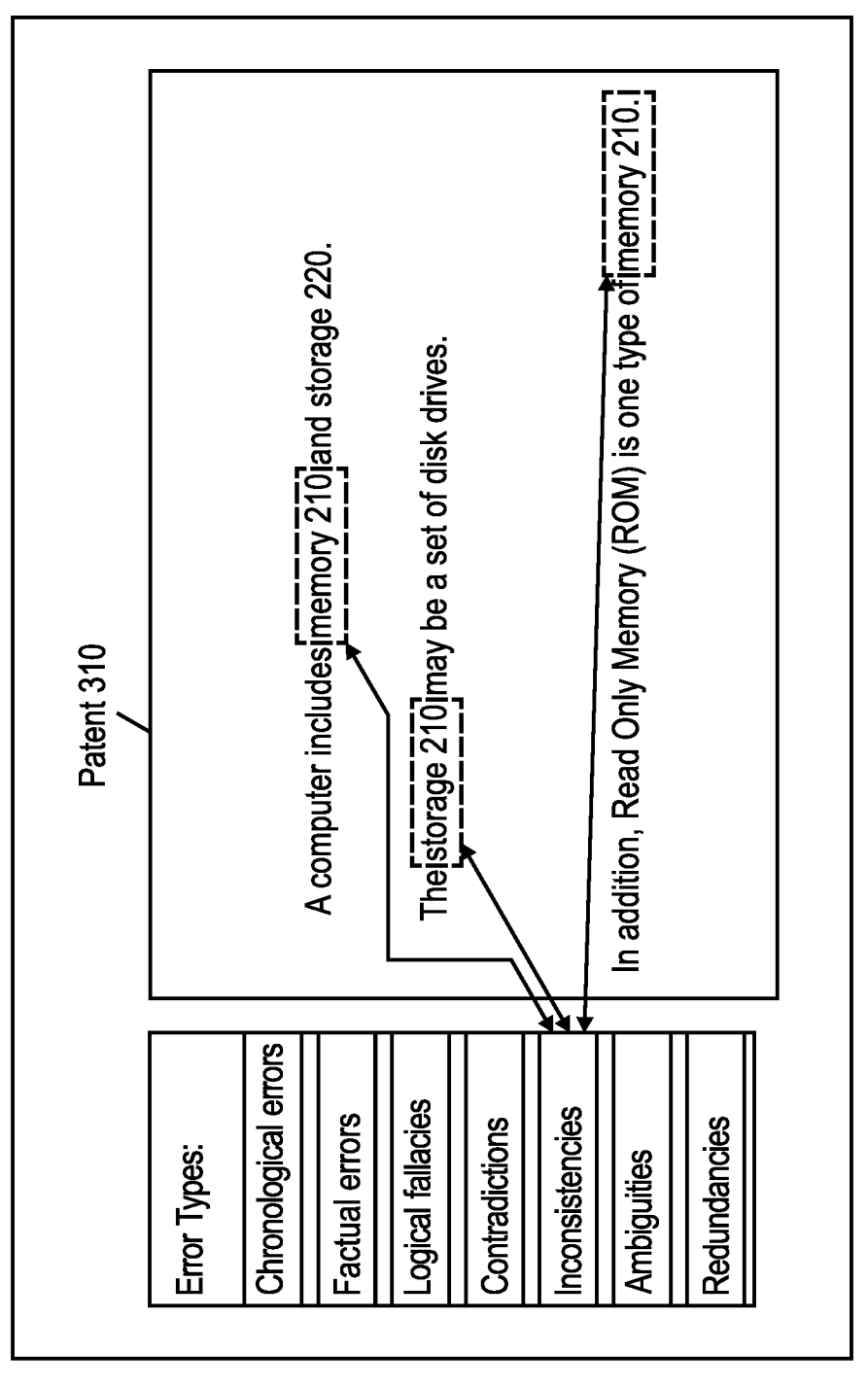
FIG. 3B illustrates an example of a contextual error in accordance with certain embodiments.

FIG. 3B illustrates an example of a contextual error in accordance with certain embodiments. In FIG. 3B, a patent 310 uses the reference number 210 for memory and for storage, which is an inconsistent use of the reference number 210.

Figure 4:
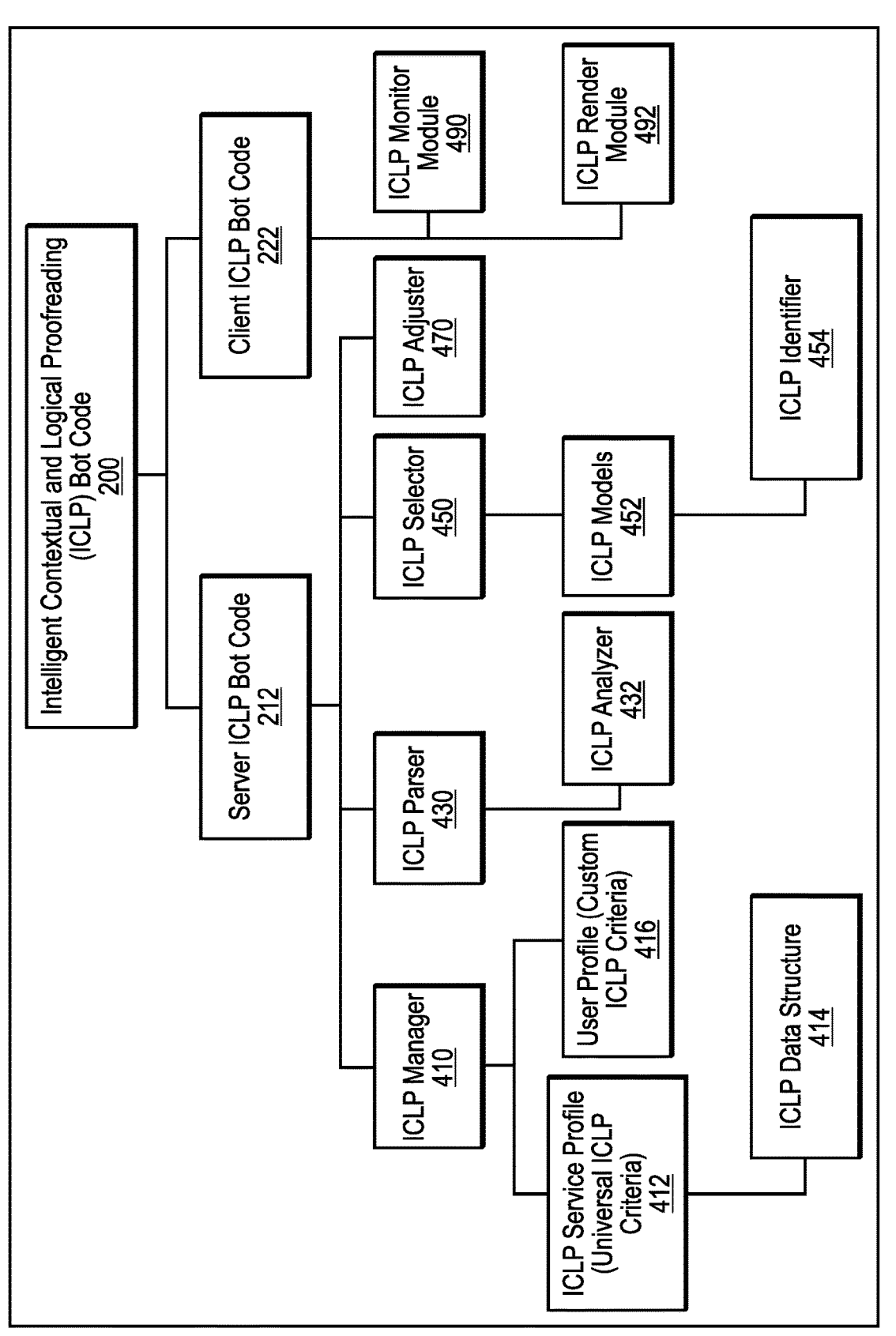
FIG. 4 illustrates, in a block diagram, components of the ICLP bot code on the server computer and on the client computer in accordance with certain embodiments.

FIG. 4 illustrates, in a block diagram, components of the ICLP bot code 200 on the server computer 210 and on the client computer 220 in accordance with certain embodiments. The ICLP bot code 200 includes a server component, the server ICLP bot code 212, that executes on the server computer 210, and a client component, the client ICLP bot code 222, that executes on the client computer 220.

The server ICLP bot code 212 is a server application that receives ICLP client requests and returns results of contextual and logical errors along with recommended corrections.

The server ICLP bot code 212 includes an ICLP manager 410, an ICLP parser 430, an ICLP selector 450, and an ICLP adjuster 470.

The ICLP manager 410 includes an ICLP service profile 412 and a user profile 416. In certain embodiments, the server ICLP bot code 212 generates an ICLP data structure 414 from the ICLP service profile 412, and the ICLP data structure 414 stores related data. The user profile 416 includes custom ICLP criteria ("custom criteria"), which may be described as user customizations and user preferences.

Thus, in certain embodiments, the ICLP service profile 412 stores universal ICLP criteria ("universal criteria", which may be defined by a system administrator), while the user profile 416 stores custom ICLP criteria. In certain embodiments, the criteria (universal or custom) include error correction rules, adjustable settings, etc.

For example, automated inconsistent error correction rules may be listed in the ICLP service profile 412 as universal ICLP criteria. The following Option-1, Option-2, and Option-3 are examples of rules.

The Option-1 rule may be described as a default rule and indicates that the "earliest use" wins rule. With Option-1, the server ICLP bot code 212 corrects any subsequent inconsistent entity name based on the earliest use of that entity name. For example, if the server ICLP bot code 212 finds inconsistent entity "storage 220" in the first paragraph and finds "storage 210" in the tenth paragraph, then the server ICLP bot code 212 treats the latter one as incorrect and corrects "storage 210" to "storage 220" in the tenth paragraph.

The Option-2 rule indicates that the "most often used" wins. For example, if the (number of times that "storage 220") is used exceeds (the number of times that "storage 210") is used, then, the server ICLP bot code 212 changes "storage 210" to "storage 220".

The Option-3 rule indicates that the "closest" wins. For example, if "storage 210" is different from the closest item before "storage 210", then the server ICLP bot code 212 changes "storage 210" to the closest one "storage 220" for consistency.

In certain embodiments, the user (e.g., a customer) may change the default option to a different one and save that rule in a user profile 416. In certain embodiments, the user may choose different options in any order and call the server ICLP bot code 212 multiple times until the errors have been fixed.

In certain embodiments, customized/personalized criteria may be defined and customized by a user and saved into the user profile 416. For example, a first user may get the automated correction feature on content from word processing applications, emails, chat applications, etc., while a second user may get the automated correction feature for word processing applications.

The ICLP manager 410 provides a user interface that allows users to configure custom ICLP criteria. The ICLP service profile 412 may be described as a configuration file for saving the universal criteria. The ICLP data structure 414 is a data structure based on the ICLP relationships for holding related data. In certain embodiments, the ICLP data structure includes columns for: a user identifier (UserID), an application identifier (AppID), a content identifier (ContentID), a content type (ContentType), a content category (ContentCategory), a topic (Topic), an input buffer (Input-Buffer), a paragraph identifier (ParagraphID), a sentence identifier (SentenceID), an error type (ErrorType), a related sentence identifier (RelatedSentence), suggested content (SuggestedContent), and proof reading comments (Proof-readingComments). The related sentence identifier (RelatedSentence) column includes a content identifier, a paragraph identifier, and a sentence identifier.

In certain embodiments, the user profile 416 stores user customizations and user preferences as custom ICLP criteria. The custom ICLP criteria includes a set of rules for defining an ICLP service. The custom ICLP criteria may identify one or more monitored applications ("Apps"), identify one or more types of errors to detect, and specify how to process the errors. The specification of how to process the errors indicates a type of response along with a threshold. The type of response for a particular contextual or logical error may be, for example, highlighting the error, showing an alert message for the error, recommending corrected content for the error, automatically correcting the error, etc. The universal criteria may be customized by users for meeting preferences, and this customization is stored in the user profile 416.

In certain embodiments, to determine an error, such as a logical error, the server ICLP bot code 212 may use a threshold, such as 55%. If the threshold is set to 55%, the server ICLP bot code 212 identifies a logical error if the conflict is greater than 55%.

For example, initially, the server ICLP bot code 212 determines that "Apple" contains 100% APPLE. Then, for sentence-1 "I normally don't eat an apple" versus sentence-2 "I like to eat apple", the server ICLP bot code 212 determines that there is 100% conflict. Since there is 100% conflict>55% threshold, the server ICLP bot code 212 treats this as a conflict between sentence-1 and sentence-2 and directly corrects sentence-2 to: "I DON'T like to eat apple".

As another example, initially, the server ICLP bot code 212 determines that "Apple Salad" contains 25% apple. Then, for sentence-3 "I normally don't eat an apple" versus sentence-4 "I like to eat apple salad", the server ICLP bot code 212 determines that there is 25% conflict. Since there is a 25% conflict<55% threshold, the server ICLP bot code 212 treats this as no conflict between sentence-3 and sentence-4 and does not make a correction.

As a further example, initially, the server ICLP bot code 212 determines that "Apple Pie" contains 75% apple. Then, for sentence-5 "I normally don't eat an apple" versus sentence-6 "I like to eat apple pie", the server ICLP bot code 212 determines that there is a 75% conflict. Since there is a 75% conflict>55% threshold, the server ICLP bot code 212 treats this as a conflict between sentence-5 and sentence-6 and provides a correct suggestion of: "I DON'T like to eat apple pie".

The ICLP parser 430 includes an ICLP analyzer 432. The ICLP parser 430 is a module for parsing the content into different elements (e.g., time, location, event, subject, verb, object etc.) in the input buffer. The ICLP analyzer 432 is a module for building and updating knowledge graphs based on parsed elements (e.g., for a current time, a location, and/or an event).

The ICLP selector 450 includes ICLP models 452, which include ICLP identifiers 454. In certain embodiments, the ICLP selector 450 is a module for selecting a proper machine learning model for identifying different contextual and logical errors according to the knowledge graphs and any combination of universal ICLP criteria in the ICLP service profile 412 and custom ICLP criteria in the user profile 416. The ICLP models 452 may include: a named entity error module, a temporal relation module, and an event error module. The named entity error module identifies and extracts temporal entities (e.g., dates, times, and durations) from the text. This is used to check that the timeline is accurate and consistent. The temporal relation module identifies and extracts temporal relations between events in the text. This is used to check for any inconsistencies or errors in the timeline. The event error module identifies events from the text. This is used to check that the relevant events are included in the timeline and that the order of events is correct. In various embodiments, other ICLP models 452 may also be used. The ICLP identifier 454 is a module for working with the one or more selected ICLP models 452 to identify contextual and logical errors.

The ICLP adjuster 470 is a module for adjusting the custom ICLP criteria for the user profile 416 and related universal ICLP criteria in the ICLP service profile 412 according to user feedback.

The client ICLP bot code 222 includes an ICLP monitor module 490 and an ICLP render module 492.

The client ICLP bot code 222 may be a plugin and/or an application that is installed in an application or at an application level. The client ICLP bot code 222 sends content to the server ICLP bot code 212 and renders corrected content received from the server ICLP bot code 212. In this manner, the client ICLP bot code 222 works with the server ICLP bot code 212 to detect and correct contextual and logical errors in real-time, improving the accuracy and clarity of the content. The ICLP monitor module 490 is a module for monitoring the input buffer in the current active application window. The ICLP render module 492 is a module for taking and rendering proper reactions (e.g., highlighting a problem, showing an alert message, providing recommended content, directly correcting the error, displaying the logic of the error detection) according to the custom ICLP criteria in the user profile 416.

In certain embodiments, the ICLP bot code 200 is a microservice in an HCI environment for 1) intelligently identifying contextual and logical errors in real-time, 2) dynamically correcting contextual and logical errors, and 3) providing a SaaS of the ICLP bot code 200 on top of the HCI environment.

Embodiments define an ICLP framework of components (FIG. 4) that include the server ICLP bot code 212 for enabling citation augmentation and the client ICLP bot code 222 that works with the server ICLP bot code 212 to detect and correct contextual and logical errors in real-time. Embodiments define a new ICLP data structure 414 with related techniques for tracking editing content in a current window.

With embodiments, users configure ICLP criteria via the ICLP manager 410, the ICLP service profile 412, the ICLP data structure 414, the user profile 416, and/or the custom ICLP criteria.

With embodiments, the ICLP monitor module 490 monitors the input buffer in the current active application window and sends the data in the input buffer to the server ICLP bot code 212 (i.e., to the ICLP parser 430 and the ICLP adjuster 470). The ICLP parser 430 parses the content from the input buffer into different elements. The ICLP analyzer 432 builds and updates the knowledge graphs based on the parsed elements in current time, location, and event. The ICLP selector 450 selects an appropriate ICLP model 452 (e.g., a machine learning model) for identifying different contextual and logical errors according to the knowledge graphs and any combination of universal ICLP criteria in the ICLP service profile 412 and custom ICLP criteria in the user profile 416. The ICLP identifier 454 uses the selected detection model to identify the contextual and logical errors. The ICLP render module 492 then renders (i.e., displays on a computer screen) the appropriate information.

The ICLP adjuster 470 adjusts the custom ICLP criteria in the user profile 416 and related universal ICLP criteria in the ICLP service profile 412 according to user feedback.

Figure 5A:
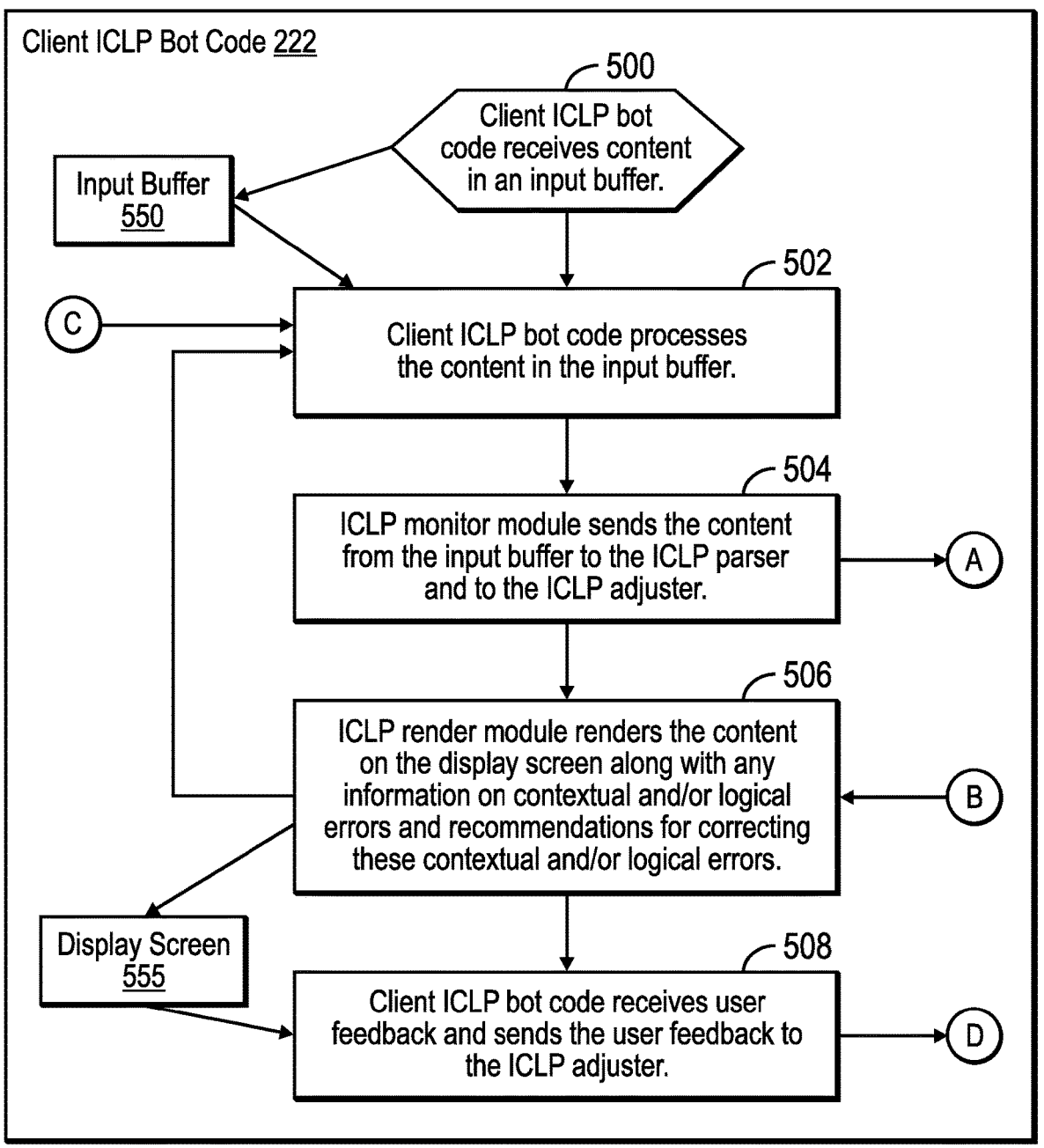
FIGS. 5A and 5B illustrate, in a flowchart, operations for automatically correcting contextual and logical errors in accordance with certain embodiments.
Figure 5B:
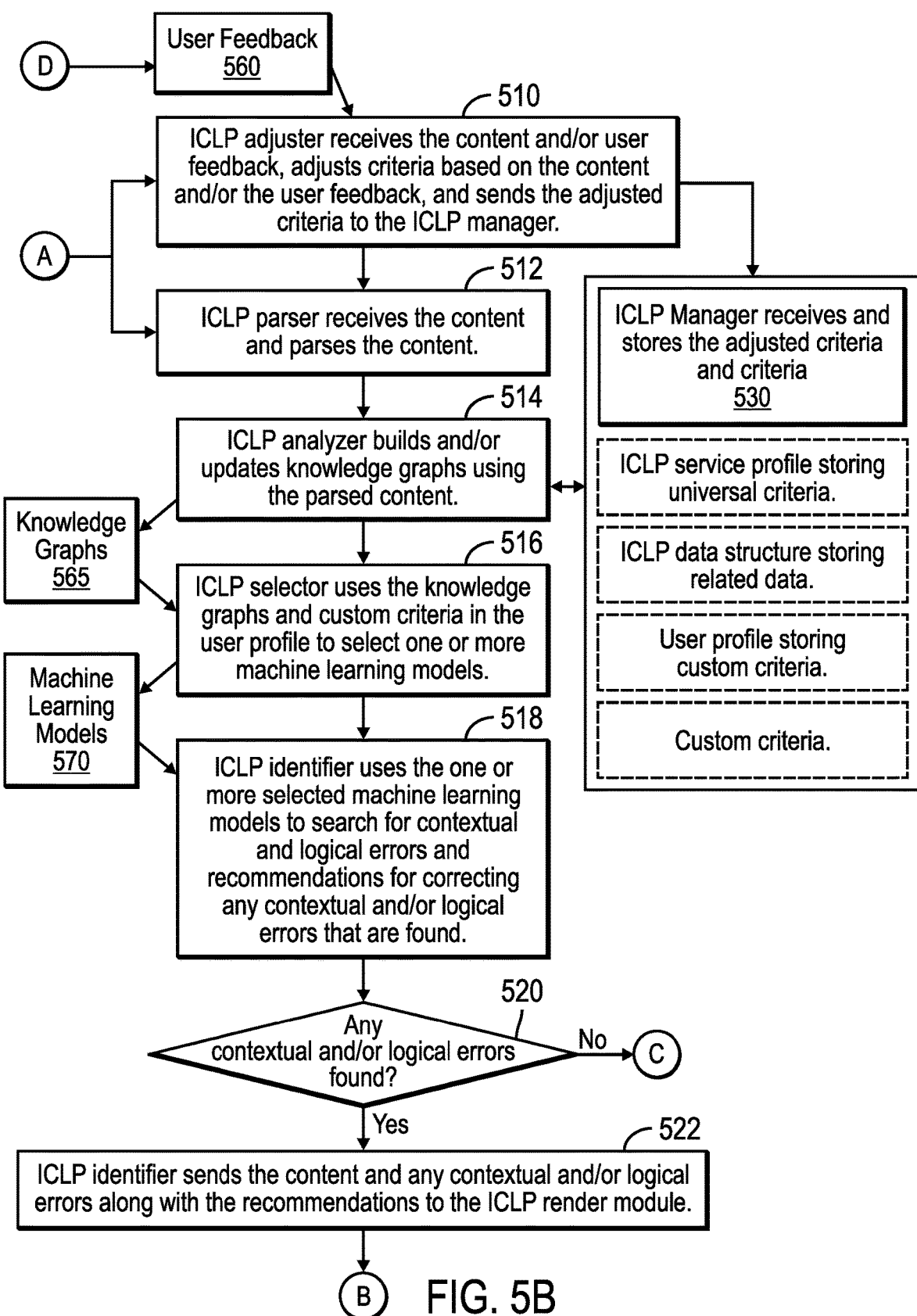

FIGS. 5A and 5B illustrate, in a flowchart, operations for automatically correcting contextual and logical errors in accordance with certain embodiments. Control begins at block 500 with the client ICLP bot code 222 receiving content in an input buffer 550. In certain embodiments, a user provides the content. In certain embodiments, the user is typing content in real time (e.g., in a chat application), while in other embodiments, the user selects a document (e.g., a patent document) as content. In block 502, the client ICLP bot code 222 processes the content in the input buffer. For example, the input buffer may store content in an editing box for a short message application, where the typed text content hasn't been sent to the receiver yet.

In block 504, the ICLP monitor module 490 sends the content from the input buffer to the ICLP parser 430 and to the ICLP adjuster 470. In block 506, the ICLP render module 492 renders the content on the display screen 555 along with any information on contextual and/or logical errors and recommendations for correcting these contextual and/or logical errors received from ICLP the ICLP identifier 454. In block 508, the client ICLP bot code 222 receives user feedback (e.g., based on what is displayed on the display screen 555) and sends the user feedback 560 to the ICLP adjuster.

In block 510, the ICLP adjuster 470 receives the content and/or user feedback 560, adjusts criteria based on the content and/or the user feedback 560, and sends the adjusted criteria to the ICLP manager 410. In certain embodiments, in block 530, the ICLP manager 410 receives the adjusted criteria from the ICLP adjuster 470. The ICLP manager 410 stores the adjusted criteria in the ICLP service profile 412, stores the adjusted related data in the ICLP data structure 414, stores the adjusted user customizations and the user preferences in the user profile 416, and stores the adjusted criteria in the custom ICLP criteria.

In block 512, the ICLP parser 430 receives the content and parses the content. In block 514, the ICLP analyzer 432 builds and/or updates knowledge graphs 565 using the parsed content. In block 516, the ICLP selector 450 uses the knowledge graphs 565 and custom ICLP criteria in the user profile 416 to select one or more machine learning models 570. In block 518, the ICLP identifier 454 uses the one or more selected machine learning models 570 to search for contextual and logical errors and recommendations for correcting any contextual and/or logical errors that are found. In block 520, the ICLP identifier 454 determines whether contextual and/or logical errors were found. If so, processing continues to block 522, otherwise, processing continues to block 502 (FIG. 5A). In block 522, the ICLP identifier 454 sends the content and any found contextual and/or logical errors along with the recommendations to the ICLP render module 492 (FIG. 5B).

FIGS. 6A and 6B illustrate an example ICLP data structure 600, 650 in accordance with certain embodiments. The ICLP data structure 600, 650 indicates that a contradiction has been found in the text from User B, and the ICLP bot code 200 provides a correction.

Figure 7:
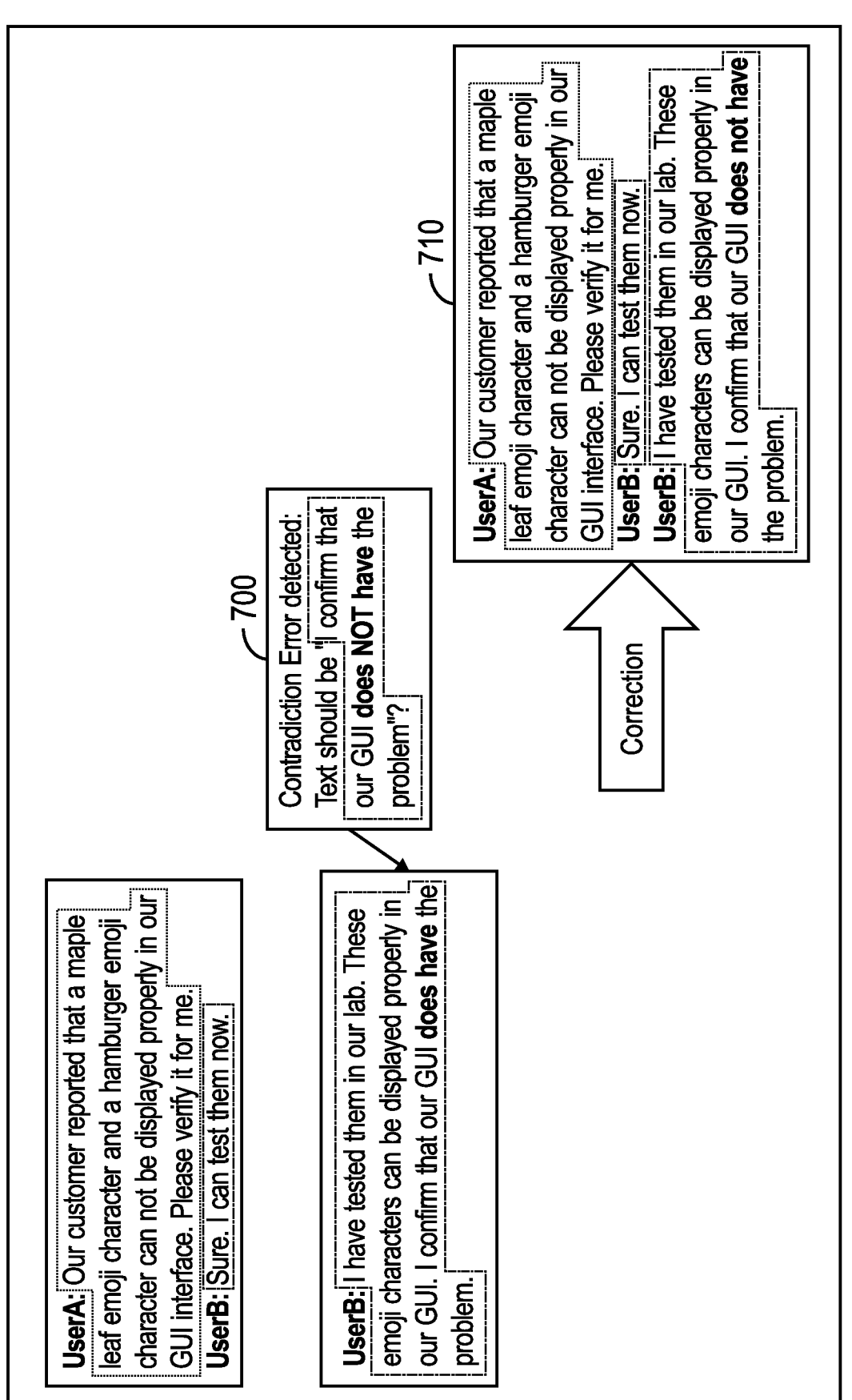
FIG. 7 illustrates an example of correcting a contradiction error in accordance with certain embodiments.

FIG. 7 illustrates an example of correcting a contradiction error in accordance with certain embodiments. In this example, the ICLP bot code 200 detects the contradiction error, displays the contradiction error in a pop up dialog window 700, and corrects that error with text 710. The ICLP bot code 200 determines that "I confirm that our GUI does have the problem" should be corrected to "I confirm that our GUI does not have the problem". In certain embodiments, the ICLP bot code 200 automatically corrects the error, while, in other embodiments, the ICLP bot code 200 provides a suggestion for correcting the error and makes the correction based on user input authorizing the correction. In certain embodiments, the ICLP bot code 200 generates the pop up dialog window 700 to show the type of logical error analysis. In FIG. 7, the ICLP bot code 200 displays, in the pop up dialog window 700, "Contradiction Error detected: Text should be: "I confirm that our GUI does NOT have the problem"?" and lets the user accept or reject the suggested correction.

Figure 8B:
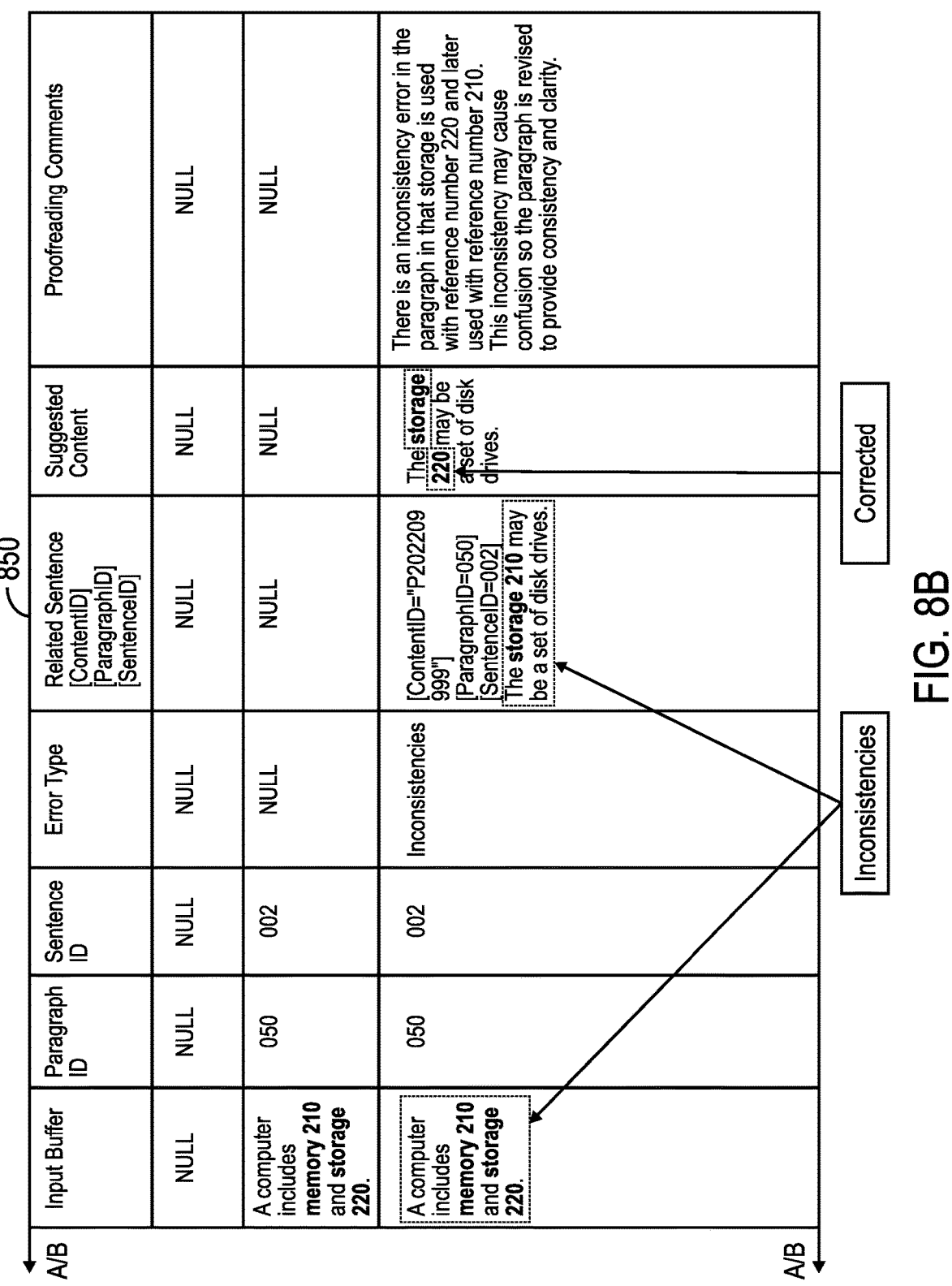

FIGS. 8A and 8B illustrate another example ICLP data structure 800, 850 in accordance with certain embodiments. The ICLP data structure 800, 850 indicates that an inconsistency has been found in the patent, and the ICLP bot code 200 provides a correction.

Figure 9:
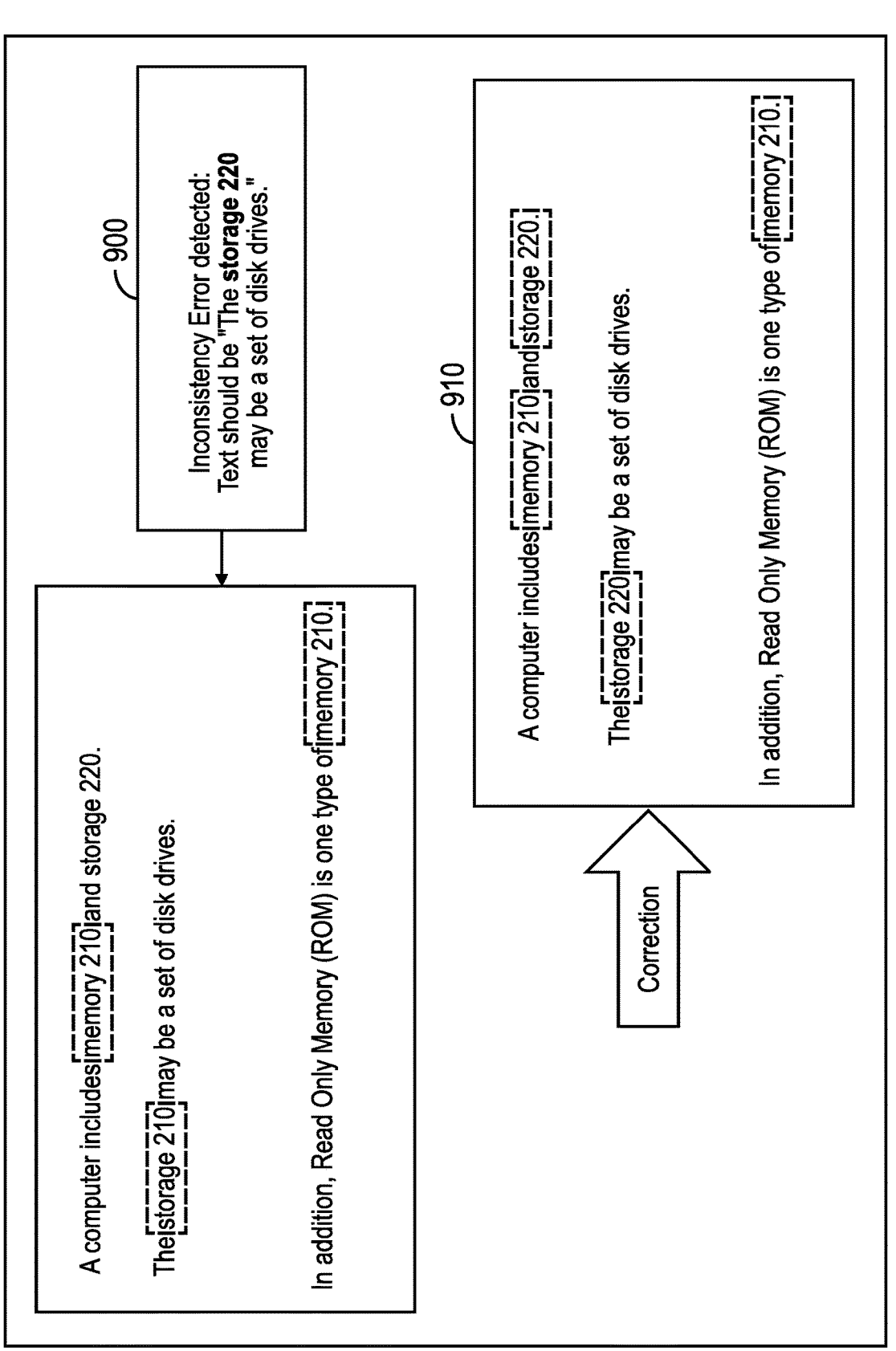
FIG. 9 illustrates an example of correcting an inconsistency error in accordance with certain embodiments.

FIG. 9 illustrates an example of correcting an inconsistency error in accordance with certain embodiments. In this example, the ICLP bot code 200 uses the knowledge graph to determine that memory has reference number 210, while storage has reference number 220. The ICLP bot code 200 detects the inconsistency error, displays the inconsistency error in a pop up dialog window 900, and corrects that error to storage 220 in text 910. In certain embodiments, the ICLP bot code 200 automatically corrects the error, while, in other embodiments, the ICLP bot code 200 provides a suggestion for correcting the error and makes the correction based on user input authorizing the correction. In certain embodiments, the ICLP bot code 200 generates the pop up dialog window 900 to show the type of logical error analysis. In FIG. 9, the ICLP bot code 200 displays "Inconsistency Error detected: Text should be "The storage 220 may be a set of disk drives" and lets the user accept or reject the suggested correction.

The ICLP bot code 200 improves the overall quality of written communications and increases user satisfaction.

Figure 10:
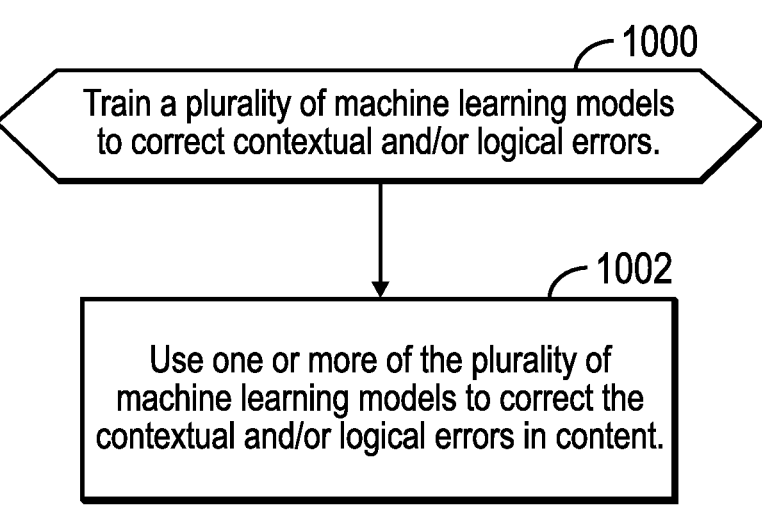
FIG. 10 illustrates, in a flowchart, operations for training a machine learning model to automatically correct contextual and logical errors in accordance with certain embodiments.

FIG. 10 illustrates, in a flowchart, operations for training a plurality of machine learning models to automatically correct contextual and logical errors in accordance with certain embodiments. Control begins at block 1000 with the ICLP bot code 200 training a plurality of machine learning models to correct contextual and/or logical errors. In certain embodiments, each of machine learning models detects and corrects a subset of possible contextual and/or logical errors. In certain embodiments, a subset of the plurality of machine learning models are selected for use and loaded into memory. In block 1010, the ICLP bot code 200 uses one or more of the plurality of machine learning models to correct the contextual and/or logical errors in content.

Figure 11A:
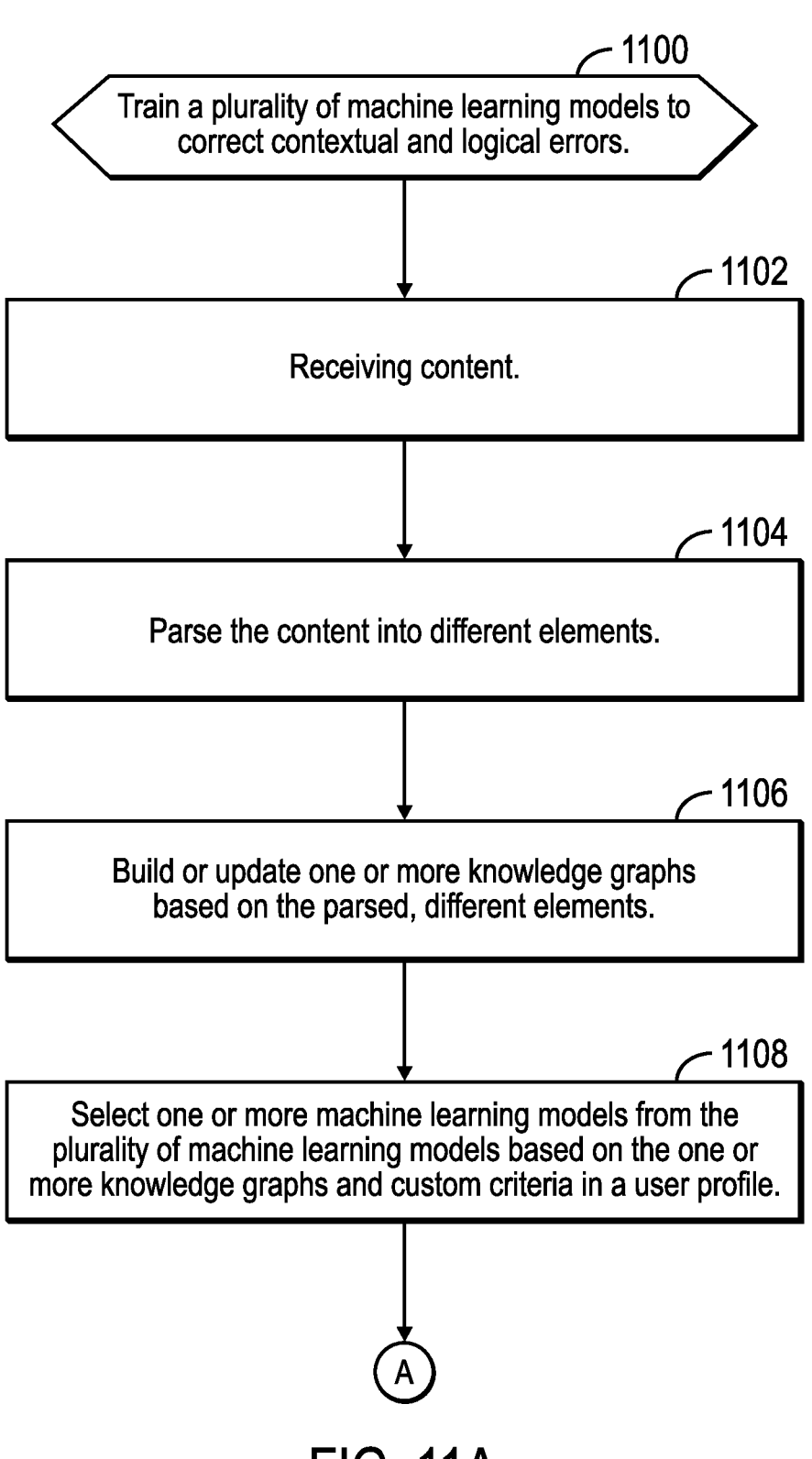
FIGS. 11A and 11B illustrate, in a flowchart, operations for using the machine learning model to correct the contextual and logical errors in accordance with certain embodiments.
Figure 11B:
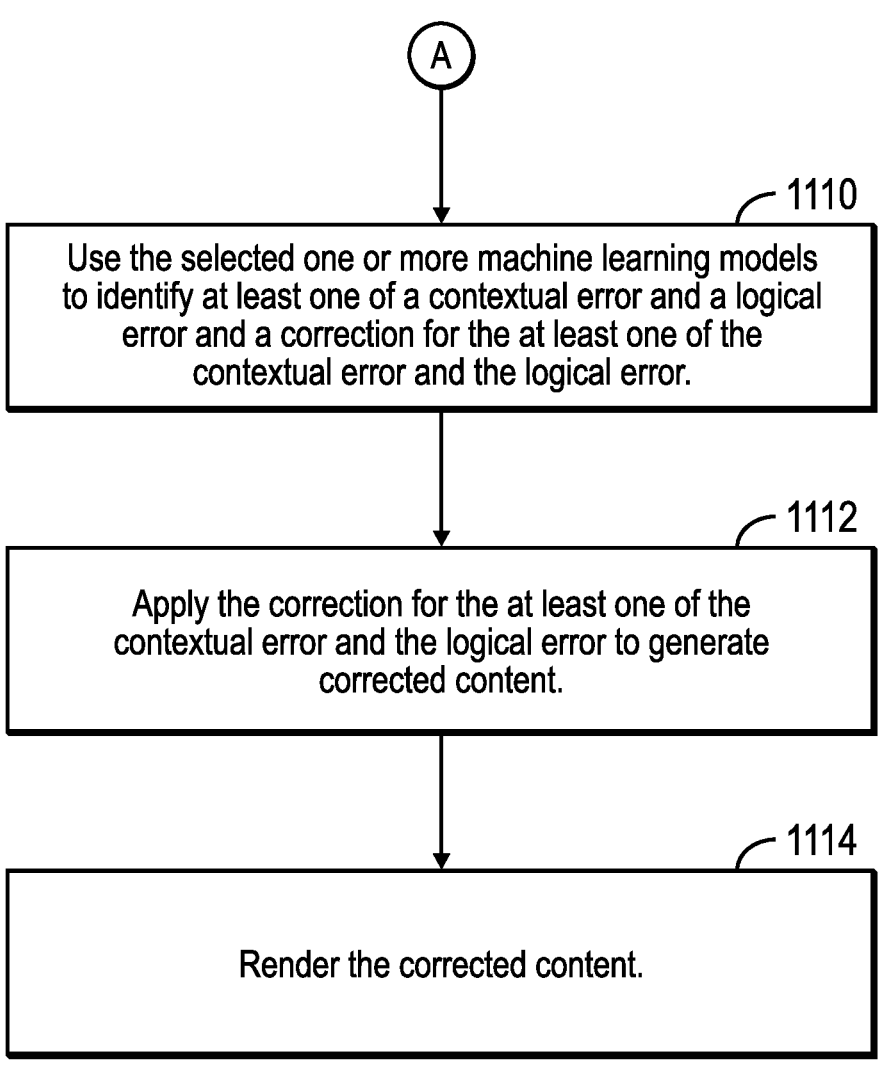

FIGS. 11A and 11B illustrate, in a flowchart, operations for using the machine learning model to correct the contextual and logical errors in accordance with certain embodiments. Control begins at block 1100 with the ICLP bot code 200 training a plurality of machine learning models. In block 1102, the ICLP bot code 200 receives content (e.g., by monitoring an input buffer for the content). In block 1104, the ICLP bot code 200 parses the content into different elements. For example, the different elements may be based on time, location, event, subject, verb, and object.

In block 1106, the ICLP bot code 200 builds or updates one or more knowledge graphs based on the parsed, different elements. In block 1108, the ICLP bot code 200 selects one or more machine learning models from the plurality of machine learning models based on the one or more knowledge graphs and custom criteria in a user profile. From block 1108 (FIG. 11A), processing continues to block 1110 (FIG. 11B). In block 1110, the ICLP bot code 200 uses the selected one or more machine learning models to identify at least one of a contextual error and a logical error and a correction for the at least one of the contextual error and the logical error. That is, the ICLP bot code 200 may identify one or more contextual errors, may identify one or more logical errors or may identify a combination of contextual and logical errors. In block 1112, the ICLP bot code 200 applies the correction for the at least one of the contextual error and the logical error to generate corrected content. In block 1114, the ICLP bot code 200 renders the corrected content.

In certain embodiments, the ICLP bot code 200 receives user input to configure the custom criteria, where the custom criteria include identification of monitored applications, identification of types of the one or more errors to detect, and how to process the one or more errors. In addition, the ICLP bot code 200 adjusts the custom criteria based on user feedback on the correction. For example, if the user is satisfied with the error detection and accepts the correction, the ICLP bot code 200 identifies this as positive feedback to add to the confidence of the correction for this error. Such positive feedback may be used to further train (i.e., retrain) a machine learning model. As another example, if the user manually changes (i.e., revises) the correction, then the ICLP bot code 200 uses this change to further train the machine learning model. In certain embodiments, the user feedback may be used to update the training data.

The ICLP bot code 200 generates a data structure, where the data structure comprises columns for: a user identifier, an application identifier, a content identifier, a content type, a content category, a topic, an input buffer, a paragraph identifier, a sentence identifier, an error type, a related sentence identifier, suggested content, and proof reading comments.

ICLP bot code 200 retrains the plurality of machine learning models using user feedback on the correction. This forms a loop to have a correction output by a machine learning model be corrected with user feedback and used to further train the machine learning model.

The training data for the plurality of machine learning models comprises sample pairs of a tagged error type and a correction.

Thus, by detecting and correcting contextual and logical errors, embodiments provide enhancements over word processor applications, which are tools for writing and editing documents and that support spelling and grammar checks.

Similarly, by detecting and correcting contextual and logical errors, embodiments provide enhancements over tools and technologies (e.g., applications) available for proofreading, such as spell-checkers and grammar checkers that scan a document for errors, including spelling, grammar, punctuation, syntax, and style.

Moreover, embodiments eliminate proofreading by humans, which is time-consuming and error-prone, especially when dealing with large volumes of text or complex documents. This is because even the most experienced and skilled proofreaders may miss errors due to fatigue, distractions, and other factors.

Figure 12:
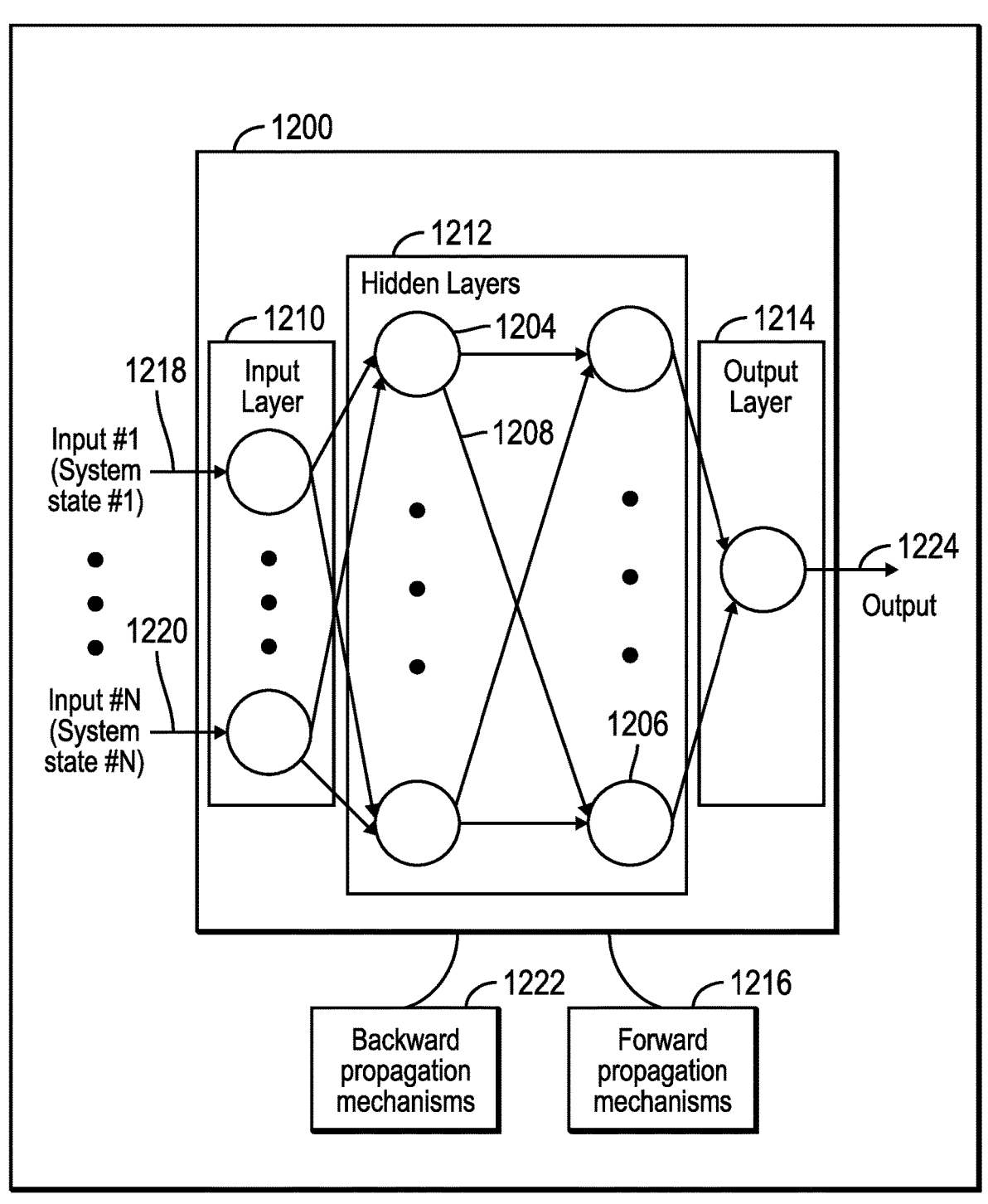
FIG. 12 illustrates, in a block diagram, details of a machine learning model in accordance with certain embodiments.

FIG. 12 illustrates, in a block diagram, details of a machine learning model 1200 in accordance with certain embodiments. In certain embodiments, the one or more machine learning models 214 are implemented using the components of the machine learning model 1200.

The machine learning model 1200 may comprise a neural network with a collection of nodes with links connecting them, where the links are referred to as connections. For example, FIG. 12 shows a node 1204 connected by a connection 1208 to the node 1206. The collection of nodes may be organized into three main parts: an input layer 1210, one or more hidden layers 1212, and an output layer 1214.

The connection between one node and another is represented by a number called a weight, where the weight may be either positive (if one node excites another) or negative (if one node suppresses or inhibits another). Training the machine learning model 1200 entails calibrating the weights in the machine learning model 1200 via mechanisms referred to as forward propagation 1216 and backward propagation 1222. Bias nodes that are not connected to any previous layer may also be maintained in the machine learning model 1200. A bias may be described as an extra input of 1 with a weight attached to it for a node.

In forward propagation 1216, a set of weights are applied to the input data 1218 . . . 1220 to calculate the output 1224. For the first forward propagation, the set of weights may be selected randomly or set by, for example, a system administrator. That is, in the forward propagation 1216, embodiments apply a set of weights to the input data 1218 . . . 1220 and calculate an output 1224.

In backward propagation 1222 a measurement is made for a margin of error of the output 1224, and the weights are adjusted to decrease the error. Backward propagation 1222 compares the output that the machine learning model 1200 produces with the output that the machine learning model 1200 was meant to produce, and uses the difference between them to modify the weights of the connections between the nodes of the machine learning model 1200, starting from the output layer 1214 through the hidden layers 1212 to the input layer 1210, i.e., going backward in the machine learning model 1200. In time, backward propagation 1222 causes the machine learning model 1200 to learn, reducing the difference between actual and intended output to the point where the two come very close or coincide.

The machine learning model 1200 may be trained using backward propagation to adjust weights at nodes in a hidden layer to produce adjusted output values based on the provided inputs 1218 . . . 1220. A margin of error may be determined with respect to the actual output 1224 from the machine learning model 1200 and an expected output to train the machine learning model 1200 to produce the desired output value based on a calculated expected output. In backward propagation, the margin of error of the output may be measured and the weights at nodes in the hidden layers 1212 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning model 1200 is configured to repeat both forward and backward propagation until the weights of the machine learning model 1200 are calibrated to accurately predict an output.

The machine learning model 1200 implements a machine learning technique such as decision tree learning, association rule learning, artificial neural network, inductive programming logic, support vector machines, Bayesian models, etc., to determine the output value 1224.

In certain machine learning model 1200 implementations, weights in a hidden layer of nodes may be assigned to these inputs to indicate their predictive quality in relation to other of the inputs based on training to reach the output value 1224.

With embodiments, the machine learning model 1200 is a neural network, which may be described as a collection of "neurons" with "synapses" connecting them.

With embodiments, there may be multiple hidden layers 1212, with the term "deep" learning implying multiple hidden layers. Hidden layers 1212 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 1216 and the backward propagation 1222.

In backward propagation 1222, embodiments measure the margin of error of the output and adjust the weights accordingly to decrease the error.

Neural networks repeat both forward and backward propagation until the weights are calibrated to accurately predict the output 1224.

In certain embodiments, the inputs to the machine learning model 1200 are content and a user profile 416 with custom ICLP criteria, and the outputs of the machine learning model 1200 are errors and corrections for those errors. In certain embodiments, the machine learning model may be refined based on whether the output recommendations, once taken, generate positive outcomes.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:

training a plurality of machine learning models; and in response to receiving content, building one or more knowledge graphs based on the content;

selecting a first subset of machine learning models from the plurality of machine learning models based on the one or more knowledge graphs and custom criteria in a user profile;

using the selected one or more machine learning models to identify at least one of a contextual error and a logical error and a correction for the at least one of the contextual error and the logical error;

applying the correction for the at least one of the contextual error and the logical error to generate corrected content;

rendering the corrected content;

adjusting the custom criteria based on user feedback on the corrected content:

in response to receiving new content, adjusting the one or more knowledge graphs based on the new content; and selecting a second subset of machine learning models from the plurality of machine learning models based on the one or more adjusted knowledge graphs and the adjusted custom criteria.

2. The computer-implemented method of claim 1, wherein the content is parsed into different elements based on time, location, event, subject, verb, and object.

3. The computer-implemented method of claim 1, further comprising operations for:

updating the one or more knowledge graphs based on receiving additional content.

4. The computer-implemented method of claim 1, further comprising operations for:

receiving user input to configure the custom criteria, wherein the custom criteria comprises identification of monitored applications, identification of types of errors to detect, and how to process the types of errors.

5. The computer-implemented method of claim 1, further comprising operations for:

generating a data structure, wherein the data structure comprises columns for: a user identifier, an application identifier, a content identifier, a content type, a content category, a topic, an input buffer, a paragraph identifier, a sentence identifier, an error type, a related sentence identifier, suggested content, and proof reading comments.

6. The computer-implemented method of claim 1, wherein each machine learning model of the plurality of machine learning models is retrained using user feedback on the correction.

7. The computer-implemented method of claim 1, wherein training data for the plurality of machine learning models comprises sample pairs of a tagged error type and a corresponding correction.

8. A computer program product, the computer program product comprising a computer readable storage medium having program instructions embodied therewith, the program instructions executable by a processor to cause the processor to perform operations for:

training a plurality of machine learning models; and in response to receiving content, building one or more knowledge graphs based on the content;

selecting a first subset of machine learning models from the plurality of machine learning models based on the one or more knowledge graphs and custom criteria in a user profile;

using the selected one or more machine learning models to identify at least one of a contextual error and a logical error and a correction for the at least one of the contextual error and the logical error;

applying the correction for the at least one of the contextual error and the logical error to generate corrected content;

rendering the corrected content;

adjusting the custom criteria based on user feedback on the corrected content;

in response to receiving new content, adjusting the one or more knowledge graphs based on the new content; and selecting a second subset of machine learning models from the plurality of machine learning models based on the one or more adjusted knowledge graphs and the adjusted custom criteria.

9. The computer program product of claim 8, wherein the content is parsed into different elements based on time, location, event, subject, verb, and object.

10. The computer program product of claim 8, wherein the program instructions are executable by the processor to cause the processor to perform operations further comprising:

updating the one or more knowledge graphs based on receiving additional content.

11. The computer program product of claim 8, wherein the program instructions are executable by the processor to cause the processor to perform operations further comprising:

receiving user input to configure the custom criteria, wherein the custom criteria comprises identification of monitored applications, identification of types of errors to detect, and how to process the types of errors.

12. The computer program product of claim 8, wherein the program instructions are executable by the processor to cause the processor to perform operations further comprising:

generating a data structure, wherein the data structure comprises columns for: a user identifier, an application identifier, a content identifier, a content type, a content category, a topic, an input buffer, a paragraph identifier, a sentence identifier, an error type, a related sentence identifier, suggested content, and proof reading comments.

13. The computer program product of claim 8, wherein each machine learning model of the plurality of machine learning models is retrained using user feedback on the correction.

14. The computer program product of claim 8, wherein training data for the plurality of machine learning models comprises sample pairs of a tagged error type and a corresponding correction.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

training a plurality of machine learning models; and in response to receiving content, building one or more knowledge graphs based on the content;

selecting a first subset of machine learning models from the plurality of machine learning models based on the one or more knowledge graphs and custom criteria in a user profile;

using the selected one or more machine learning models to identify at least one of a contextual error and a logical error and a correction for the at least one of the contextual error and the logical error;

applying the correction for the at least one of the contextual error and the logical error to generate corrected content;

rendering the corrected content;

adjusting the custom criteria based on user feedback on the corrected content;

in response to receiving new content, adjusting the one or more knowledge graphs based on the new content; and selecting a second subset of machine learning models from the plurality of machine learning models based on the one or more adjusted knowledge graphs and the adjusted custom criteria.

16. The computer system of claim 15, wherein the content is parsed into different elements based on time, location, event, subject, verb, and object.

17. The computer system of claim 15, wherein the operations further comprise:

updating the one or more knowledge graphs based on receiving additional content.

18. The computer system of claim 15, wherein the operations further comprise:

receiving user input to configure the custom criteria, wherein the custom criteria comprises identification of monitored applications, identification of types of errors to detect, and how to process the types of errors.

19. The computer system of claim 15, wherein the operations further comprise:

generating a data structure, wherein the data structure comprises columns for: a user identifier, an application identifier, a content identifier, a content type, a content category, a topic, an input buffer, a paragraph identifier, a sentence identifier, an error type, a related sentence identifier, suggested content, and proof reading comments.

20. The computer system of claim 15, wherein each machine learning model of the plurality of machine learning models is retrained using user feedback on the correction.

* * * * *